United States Patent
Lee et al.

(10) Patent No.: US 10,605,901 B2
(45) Date of Patent: Mar. 31, 2020

(54) BEAM STEERING DEVICE AND OPTICAL APPARATUS INCLUDING THE SAME

(71) Applicant: SAMSUNG ELECTRONICS CO., LTD., Suwon-si (KR)

(72) Inventors: Eunkyung Lee, Seoul (KR); Chilhee Chung, Seoul (KR); Jungwoo Kim, Hwaseong-si (KR); Dongjae Shin, Seoul (KR); Byounglyong Choi, Seoul (KR); Kyoungho Ha, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 472 days.

(21) Appl. No.: 15/436,111

(22) Filed: Feb. 17, 2017

(65) Prior Publication Data
US 2018/0031680 A1 Feb. 1, 2018

(30) Foreign Application Priority Data
Jul. 29, 2016 (KR) .................. 10-2016-0097539

(51) Int. Cl.
*G01S 7/481* (2006.01)
*G02F 1/29* (2006.01)
(Continued)

(52) U.S. Cl.
CPC .......... *G01S 7/4817* (2013.01); *G01S 7/4815* (2013.01); *G01S 7/4818* (2013.01); *G01S 17/42* (2013.01);
(Continued)

(58) Field of Classification Search
CPC ...... G01S 7/4815; G01S 7/4817; G01S 17/42; G01S 17/4818; G02F 1/29; G02F 2203/70; G02F 2001/291; G02B 26/10
(Continued)

(56) References Cited

U.S. PATENT DOCUMENTS 4,832,430 A * 5/1989 Tada .................. G02F 1/3138
385/18
5,440,669 A * 8/1995 Rakuljic .............. G02B 5/1857
359/1
(Continued)

FOREIGN PATENT DOCUMENTS

JP     2015-215318 A   12/2015
KR   10-0770750 B1   10/2007
(Continued)

OTHER PUBLICATIONS

Communication dated Jan. 3, 2018, issued by the European Patent Office in counterpart European Application No. 17165694.5.
(Continued)

*Primary Examiner* — Daniel L Murphy
(74) *Attorney, Agent, or Firm* — Sughrue Mion, PLLC

(57) ABSTRACT

Beam steering devices and optical apparatuses including the beam steering devices are provided. A beam steering device includes a light source configured to generate input lights having first different wavelengths, a multiplexer configured to simultaneously receive the generated input lights, and multiplex the received input lights into a multiplexed light, and an optical splitter configured to split the multiplexed light. The beam steering device further includes an optical modulator configured to modulate the split light, and an emitter configured to simultaneously emit output lights having second different wavelengths to different points arranged in a first direction, based on the modulated light.

27 Claims, 17 Drawing Sheets

(51) Int. Cl.
*G01S 17/42* (2006.01)
*G02B 26/10* (2006.01)

(52) U.S. Cl.
CPC ........... *G02B 26/10* (2013.01); *G02F 1/29* (2013.01); *G02F 2001/291* (2013.01); *G02F 2203/70* (2013.01)

(58) Field of Classification Search
USPC ...................................................... 356/4.01
See application file for complete search history.

(56) References Cited

U.S. PATENT DOCUMENTS

| | | | | |
|---|---|---|---|---|
| 5,652,763 | A | * | 7/1997 | Delfyett, Jr. .......... H01S 5/0657 372/107 |
| 5,988,862 | A | * | 11/1999 | Kacyra ................ G01B 11/002 382/195 |
| 9,234,964 | B2 | | 1/2016 | Mheen et al. |
| 9,310,487 | B2 | | 4/2016 | Sakimura et al. |
| 2013/0242400 | A1 | | 9/2013 | Chen |
| 2014/0376001 | A1 | | 12/2014 | Swanson |
| 2015/0109603 | A1 | | 4/2015 | Kim et al. |
| 2016/0161600 | A1 | | 6/2016 | Eldada et al. |
| 2017/0098917 | A1 | * | 4/2017 | Popovic ............... H04B 10/506 |
| 2017/0356983 | A1 | * | 12/2017 | Jeong .................... G01S 7/4817 |

FOREIGN PATENT DOCUMENTS

| | | |
|---|---|---|
| KR | 10-2013-0140554 A | 12/2013 |
| KR | 10-2015-0045735 A | 4/2015 |

OTHER PUBLICATIONS

Acoleyen et al., "Off-chip beam steering with a one-dimensional optical phased array on silicon-on-insulator", vol. 34, No. 9, Optics Letters, May 1, 2009, pp. 1477-1479, 3 pages total.

* cited by examiner

< COMPARATIVE EXAMPLE >

BEAM STEERING DEVICE AND OPTICAL APPARATUS INCLUDING THE SAME

CROSS-REFERENCE TO RELATED APPLICATION

This application claims priority from Korean Patent Application No. 10-2016-0097539, filed on Jul. 29, 2016 in the Korean Intellectual Property Office, the disclosure of which is incorporated herein by reference in its entirety.

BACKGROUND

1. Field

Apparatuses consistent with example embodiments relate to optical devices and optical apparatuses, and more particularly, to beam steering devices and optical apparatuses including the beam steering devices.

2. Description of the Related Art

There has been increasing interest in techniques using light (beam) for measuring the distance to an object or the direction of an object, recognizing an object or the topography of an area, or detecting information about the velocity, temperature, material distribution, etc. of an object. In this regard, research has been conducted into methods for adjusting the direction of light (beam) generated by a light source, that is, methods of beam steering.

Mechanical beam steering methods in which the direction of a beam is controlled by rotating some components, using a motor, have problems in terms of noise, size (volume), accuracy, etc. A typical non-mechanical beam steering method is a steering method using a micro-electro-mechanical system (MEMS) mirror. However, this method also has problems in terms of the field of view (FOV) and light transmitting distance.

Therefore, there is a need for techniques for improving performance indexes such as accuracy, precision, or speed in analysis and measurement, using a non-mechanical beam steering method.

SUMMARY

Example embodiments may address at least the above problems and/or disadvantages and other disadvantages not described above. Also, the example embodiments are not required to overcome the disadvantages described above, and may not overcome any of the problems described above.

Example embodiments provide beam steering devices configured to improve or increase the accuracy, precision, and speed of spatial analysis/measurement processes.

Example embodiments provide beam steering devices capable of scanning objects (subjects) at high speed.

Example embodiments provide beam steering devices capable of simultaneously emitting and steering a plurality of beams having multiple wavelengths.

Example embodiments provide optical apparatuses (for example, LiDAR apparatuses) including the beam steering devices.

According to an aspect of an example embodiment, there is provided a beam steering device including a light source configured to generate input lights having first different wavelengths, a multiplexer configured to simultaneously receive the generated input lights, and multiplex the received input lights into a multiplexed light, and an optical splitter configured to split the multiplexed light. The beam steering device further includes an optical modulator configured to modulate the split light, and an emitter configured to simultaneously emit output lights having second different wavelengths to different points arranged in a first direction, based on the modulated light.

As the split light is further modulated, the emitted output lights may be moved in a second direction different from the first direction.

The first direction may be perpendicular to the second direction.

Either one or both of the emitter and the optical modulator may include waveguides, the first direction may be parallel to an extension direction of the waveguides, and the second direction may be perpendicular to the extension direction of the waveguides.

Either one or both of the emitter and the optical modulator may include waveguides, and the first direction may be parallel to an extension direction of the waveguides.

The optical modulator may include a phase modulator.

The light source may include laser sources or a multimode laser source, wherein the laser sources or the multimode laser source may be configured to generate lasers having the first different wavelengths as the generated input lights.

The light source may include a laser source configured to generate a laser having a wavelength, and a wavelength converter configured to divide the generated laser into lasers having the first different wavelengths as the generated input lights.

The light source may include a light emitting diode (LED) configured to generate light, and a multi-band pass filter configured to divide the generated light into the generated input lights.

Each of the generated input lights may have a pulse waveform.

Any one or any combination of the optical splitter, the optical modulator, and the emitter may include any one or any combination of a group IV element, a compound including a group IV element, a group III-V compound, an oxide, a nitride, and a polymer.

The beam steering device may further include an amplifier disposed between the multiplexer and the emitter, and having a semiconductor optical amplifier (SOA) structure.

An optical apparatus may include the beam steering device, a light receiver configured to receive light that is emitted from the beam steering device and reflected from an object, and a circuit connected to either one or both of the beam steering device and the light receiver.

The optical apparatus may further include a demultiplexer disposed between the object and the light receiver, and configured to demultiplex the reflected light, and divide the demultiplexed light into reflected lights having third different wavelengths, the light receiver may be further configured to receive the reflected lights.

The light receiver may include photo detecting elements, and the optical apparatus may be configured to acquire information of the third different wavelengths of the reflected lights, using the photo detecting elements, and analyze information of the object, based on the acquired information.

The optical apparatus may be a LiDAR apparatus.

According to an aspect of another example embodiment, there is provided a beam steering device including an input coupler configured to simultaneously receive input lights having first different wavelengths, and an output coupler configured to simultaneously emit output lights having second different wavelengths to different points arranged in a first direction, and move the emitted output lights in a second direction different from the first direction, based on the received input lights.

The beam steering device may further include waveguides disposed between the input coupler and the output coupler, the first direction may be parallel to an extension direction of the waveguides, and the second direction may be perpendicular to the extension direction of the waveguides.

The beam steering device may further include an optical modulator disposed between the input coupler and the output coupler, and configured to move the emitted output lights in the second direction, based on the received input lights.

The received input lights may include lasers having the first different wavelengths.

The input coupler may include a multiplexer configured to simultaneously receive the input lights, and multiplex the received input lights.

An optical apparatus may include the beam steering device, a light receiver configured to receive light that is emitted from the beam steering device and reflected from an object; and a circuit connected to either one or both of the beam steering device and the light receiver.

The optical apparatus may further include a demultiplexer disposed between the object and the light receiver, and configured to demultiplex the reflected light, and divide the demultiplexed light into reflected lights having third different wavelengths, and the light receiver may be further configured to receive the reflected lights.

The optical apparatus may be a LiDAR apparatus.

According to an aspect of an example embodiment, there is provided a beam steering device including a multiplexer configured to simultaneously receive input lights having first different wavelengths, and multiplex the received input lights into a multiplexed light, and an optical splitter configured to split the multiplexed light. The beam steering apparatus further includes an optical modulator configured to modulate the split light, and an emitter configured to simultaneously emit output lights having second different wavelengths to different points arranged in a first direction and of an object, and move the emitted output lights in a second direction different from the first direction, based on the modulated light.

The beam steering device may further include laser sources configured to generate lasers having the first different wavelengths, and input couplers configured to simultaneously receive the generated lasers, and transmit the received lasers to the multiplexer as the input lights.

Either one or both of the emitter and the optical modulator may include a substrate, an insulative layer disposed on the substrate, and waveguides disposed on the insulative layer. The first direction may be parallel to an extension direction of the waveguides, and the second direction may be perpendicular to the extension direction of the waveguides.

The beam steering device may further include a cover layer disposed on the multiplexer, the optical splitter, the optical modulator, and the emitter.

An optical apparatus may include the beam steering device, and a demultiplexer configured to receive light that is reflected from the object, demultiplex the reflected light, and divide the demultiplexed light into reflected lights having third different wavelengths. The optical apparatus may further include a filter configured to filter the reflected lights, and a light receiver configured to receive the filtered reflected lights.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
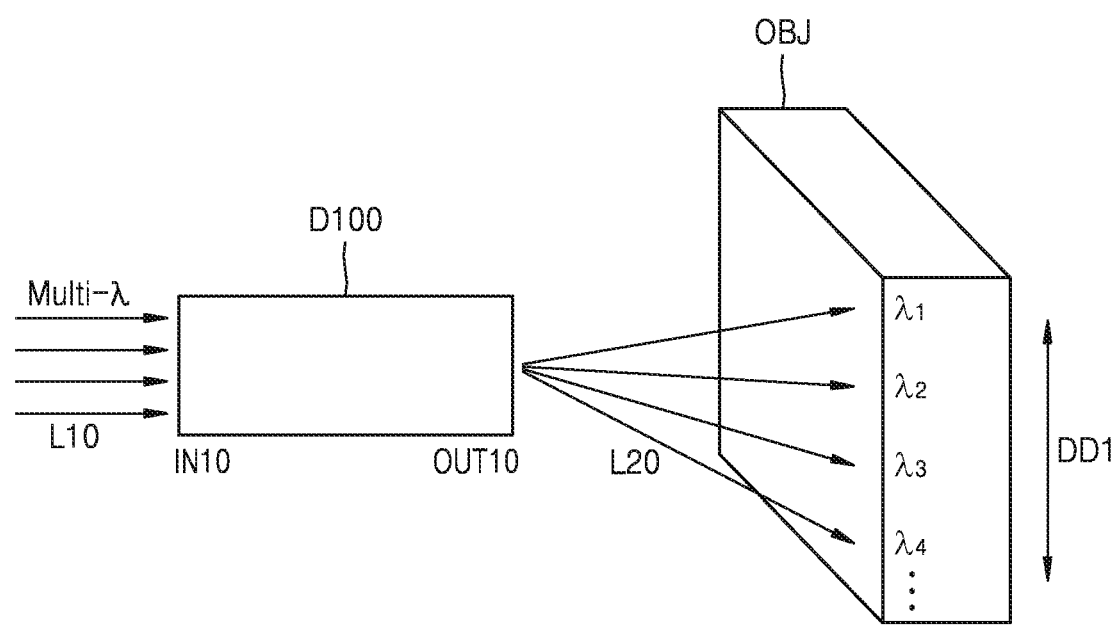
FIGS. 1 and 2 are schematic views illustrating a beam steering device according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions may not be described in detail because they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first," "second," etc. may be used herein to describe various elements, components, regions, layers and/or sections, these elements, components, regions, layers and/or sections may not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments may not be construed as limited to the shapes of regions illustrated herein but are to include deviations in shapes that result, for example, from manufacturing. For example, an implanted region illustrated as a rectangle will have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, may be interpreted as having a meaning that is consistent with their meaning in the context of the relevant art and will not be interpreted in an idealized or overly formal sense unless expressly so defined herein.

Hereinafter, beam steering devices and optical apparatuses including the beam steering devices will be described according to example embodiments with reference to the accompanying drawings. In the drawings, the widths and thicknesses of layers or regions may be exaggerated for clarity or ease of description.

Figure 2:
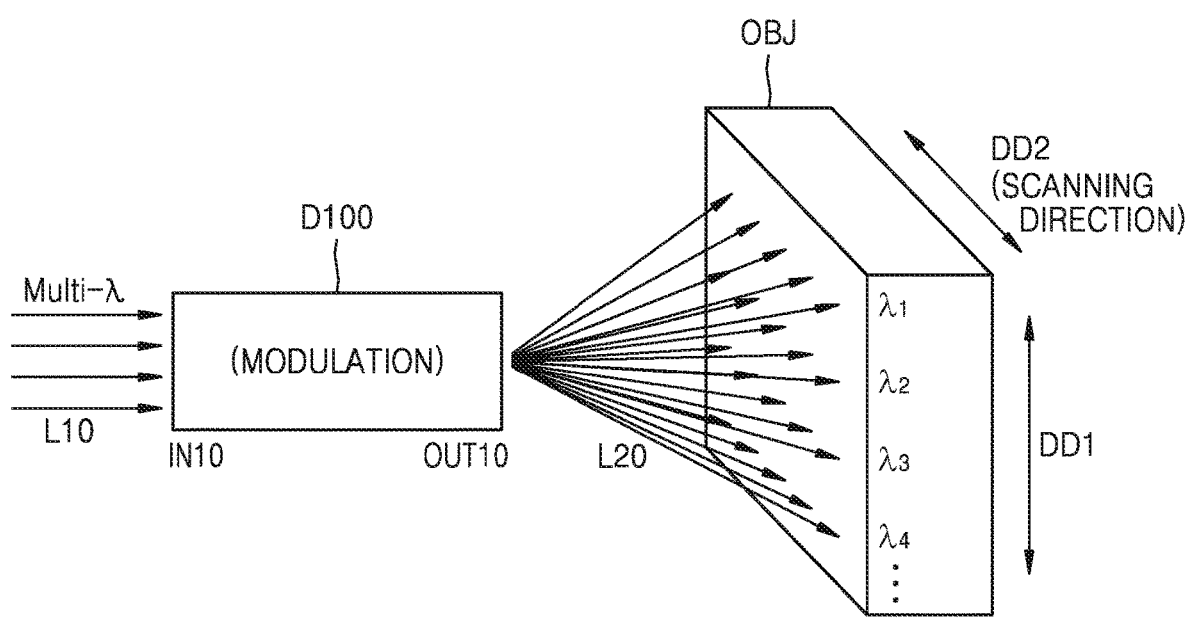

FIGS. 1 and 2 are schematic views illustrating a beam steering device D100 according to an example embodiment.

Referring to FIG. 1, the beam steering device D100 may include an input coupler IN10 and an output coupler OUT10. A plurality of lights (beams) L10 having different wavelengths may be simultaneously input through the input coupler IN10. In other words, multi-wavelength (multi-$\lambda$) light L10 may be input through the input coupler IN10.

A plurality of output lights (beams) L20 having different wavelengths may be simultaneously emitted toward an object OBJ through the output coupler OUT10. The plurality of output lights L20 may be simultaneously emitted to different points arranged in a first direction DD1. The points toward which the output lights L20 are emitted may be one-dimensionally arranged. In other words, the output lights L20 may be simultaneously emitted toward a plurality of points that are one-dimensionally arranged in a line. The wavelengths of the output lights L20 may include a first wavelength $\lambda_1$, a second wavelength $\lambda_2$, a third wavelength $\lambda_3$, a fourth wavelength $\lambda_4$, etc. However, this is an example. That is, the number of the wavelengths of the output lights L20 may vary.

The illustrated structure of the object OBJ is an example. That is, the object OBJ may have a different structure, size, etc. The object OBJ is not limited to a type. For example, the object OBJ may be a space or anything existing in a space.

According to the example embodiment, the beam steering device D100 may simultaneously emit the plurality of output lights L20 having different wavelengths to detect/search a plurality of points in the first direction DD1. In addition, the beam steering device D100 may vary (change) the emission directions of the output lights L20 in a direction different from the first direction DD1. This will now be described with reference to FIG. 2.

Referring to FIG. 2, the beam steering device D100 may be configured to change the emission directions of the output lights L20 in a second direction DD2 different from the first direction DD1. For example, the second direction DD2 may be perpendicular to the first direction DD1. The emission directions of the output lights L20 may be varied in the second direction DD2 by optical modulation performed in the beam steering device D100. The emission directions of the output lights L20 having different wavelengths (for example, wavelengths $\lambda_1$ to $\lambda_4$) may vary with time in the second direction DD2 as a result of the optical modulation. Thus, the second direction DD2 may be referred to as a "scanning direction."

According to the example embodiment, the beam steering device D100 may perform a scanning operation while changing the emission directions of the output lights L20 in the second direction DD2. Therefore, the beam steering device D100 may perform a two-dimensional scanning operation at a relatively high speed compared to point-by-point beam steering devices.

Figure 3:
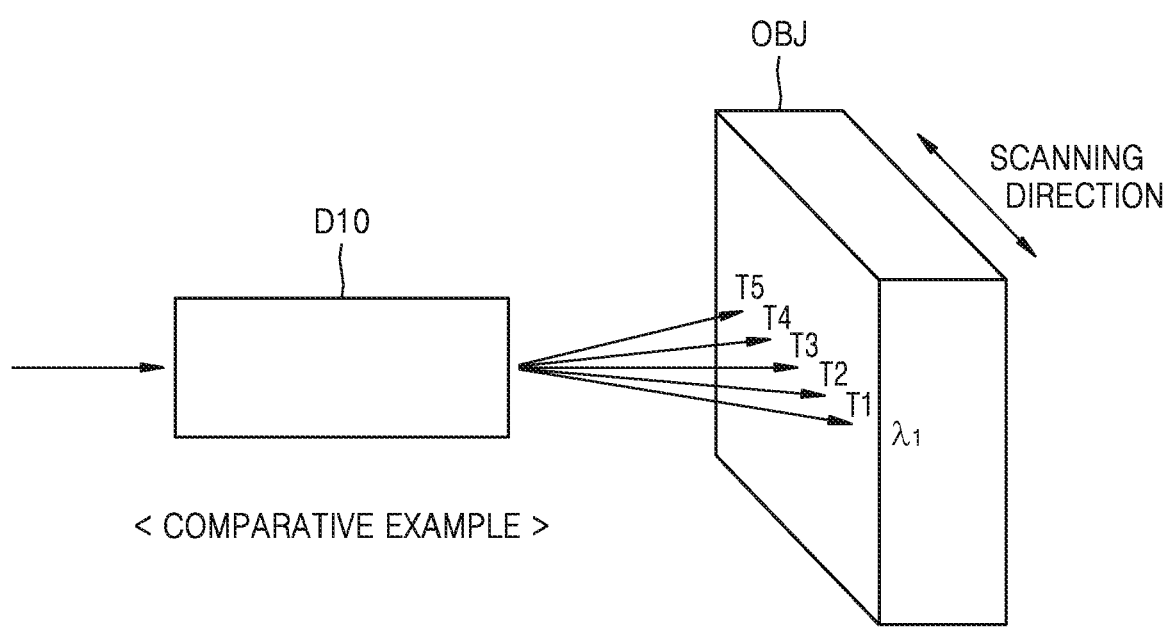
FIG. 3 is a schematic view illustrating a beam steering device according to a comparative example.

FIG. 3 is a schematic view illustrating a beam steering device D10 according to a comparative example.

Referring to FIG. 3, the beam steering device D10 of the comparative example may perform a point-by-point scanning operation. For example, the beam steering device D10 of the comparative example may scan an object OBJ while moving an output light (beam) having a single wavelength $\lambda_1$ in a scanning direction. The output light having a single wavelength $\lambda_1$ may be emitted to a first point at a first time point T1, a second point at a second time point T2, a third point at a third time point T3, a fourth point at a fourth time point T4, and a fifth point at a fifth time point T5. Thus, it may be considered that the beam steering device D10 performs a one-dimensional scanning operation. Complex and difficult techniques may be used to perform a two-dimensional scanning operation, using the beam steering device D10. In addition, because such a one-dimensional or two-dimensional scanning operation is performed basically by using a point-by-point method, the speed, accuracy, and precision of the scanning operation may be low. For example, because the first point is detected at the first time point T1 and the fifth point is detected at the fifth time point T5, the accuracy and precision of detection may be low because of a detection time difference. The accuracy and precision of detection/analysis may be decreased as the speed of scanning is decreased.

However, if the beam steering device D100 of the example embodiment is used, a two-dimensional scanning operation may be performed at a high speed by simultaneously emitting the plurality of output lights L20 having different wavelengths. Thus, the speed of detection/analysis may be increased, and the accuracy and precision of detection/analysis may be markedly improved.

Figure 4:
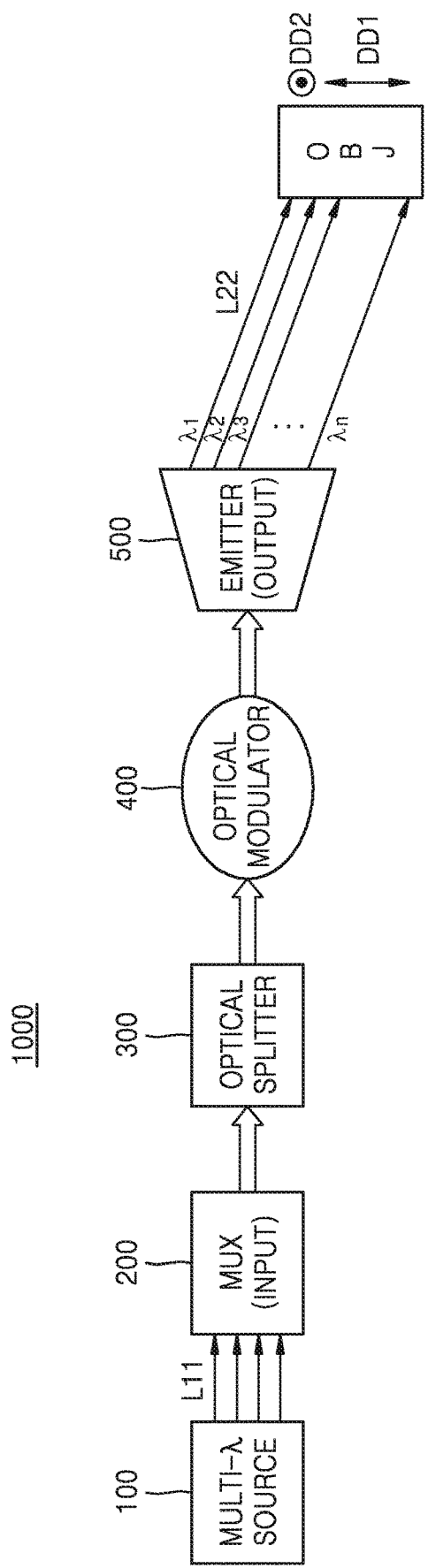
FIG. 4 is a block diagram illustrating an example configuration of the beam steering device depicted in FIG. 1.

FIG. 4 is a block diagram illustrating an example configuration of the beam steering device D100 depicted in FIG. 1. In FIG. 4, the beam steering device D100 is indicated using a reference numeral 1000.

Referring to FIG. 4, a light source unit 100 may generate a plurality of lights L11 having different wavelengths. The plurality of lights L11 may be referred to as multi-wavelength (multi-$\lambda$) electromagnetic waves. For example, the plurality of lights L11 may be a plurality of lasers (laser beams) having different wavelengths. However, the plurality of lights L11 may be another kind of light other than a laser. The light source unit 100 may generate the plurality of lights L11 at the same time.

A multiplexer (MUX) 200 may simultaneously receive and multiplex the plurality of lights L11 generated by the light source unit 100. The multiplexer 200 may have a general optical multiplexer structure. In addition, the multiplexer 200 may also function as an input coupler.

An optical splitter 300 may split the light multiplexed by the multiplexer 200. The optical splitter 300 may be a beam splitter. Each of lights (beams) split by the optical splitter 300 may have multiple wavelengths (multi-$\lambda$).

An optical modulator 400 may modulate the multiplexed light split by the optical splitter 300. The optical modulator 400 may modulate light by various methods. For example, the optical modulator 400 may modulate the phase of the light split by the optical splitter 300. Alternatively, the optical modulator 400 may modulate the amplitude of the light split by the optical splitter 300. Alternatively, the optical modulator 400 may modulate both the phase and amplitude of the light split by the optical splitter 300. In addition to this, the optical modulator 400 may have other optical modulation functions. The optical modulator 400 may perform optical modulation by using a method such as an electric method, a magnetic method, a thermal method, or a mechanical method. For example, the optical modulator 400 may include at least one phase shifter (or phase shifting element), and the phase shifter may include at least one selected from the group consisting of a gain element, an all-pass filter, a Bragg grating, a dispersive material element, a wavelength tuning element, and a phase tuning element. In addition, an actuation mechanism of the optical modulator 400 may include at least one selected from the group consisting of a thermo-optic actuation mechanism, an electro-optic actuation mechanism, an electroabsorption actuation mechanism, a free carrier absorption actuation mechanism, a magneto-optic actuation mechanism, a liquid crystal actuation mechanism, and an all-optical actuation mechanism. The actuation mechanism of the optical modulator 400 may be related to the above-described phase tuning. The phase shifter and the actuation mechanism of the optical modulator 400 of the example embodiment are not limited to the above examples.

An emitting portion (emitter) 500 may receive light from the optical modulator 400 and may simultaneously emit a plurality of output lights L22. The output lights L22 may have different wavelengths (for example, wavelengths $\lambda_1$, $\lambda_2$, $\lambda_3$, ..., and $\lambda_n$). The plurality of output lights L22 may be emitted to different points arranged in a first direction DD1. The wavelengths of the output lights L22 may correspond to or may be similar to the wavelengths of the lights L11 generated by the light source unit 100. The output lights L22 may correspond to the output lights L20 described with reference to FIG. 1.

Due to the optical modulation by the optical modulator 400, the emission directions of the output lights L22 may be varied in a second direction DD2 different from the first direction DD1. For example, as the optical modulator 400 performs a modulation operation such as a phase modulation operation on light (split lights), the emission directions of the output lights L22 may be varied in the second direction DD2. For example, the second direction DD2 may be perpendicular to the first direction DD1. The first direction DD1 and the second direction DD2 may correspond to the first direction DD1 and the second direction DD2 described with reference to FIG. 2. Thus, the second direction DD2 may be referred to as a scanning direction.

The emitter 500 may be an output coupler. For example, the emitter 500 may include a plurality of waveguides. In addition, the emitter 500 may further include grating structures formed on the waveguides. The grating structures may be designed to direct a beam having a wavelength in a direction. However, the configuration of the emitter 500 is not limited thereto. That is, the configuration of the emitter 500 may be variously modified.

In the example embodiment, the beam steering device 1000 may include the multiplexer 200, the optical splitter 300, the optical modulator 400, and the emitter 500. In this case, the multiplexer 200 may be an input coupler, and the emitter 500 may be an output coupler. The multiplexer 200, the optical splitter 300, the optical modulator 400, and the emitter 500 may form a single device (an optical semiconductor device), and the light source unit 100 may be provided separately from the single device and may emit a plurality of lights L11 toward the multiplexer 200. In a broad sense, however, the light source unit 100 may be considered as a part of the beam steering device 1000. That is, it may be considered that the beam steering device 1000 includes the light source unit 100, the multiplexer 200, the optical splitter 300, the optical modulator 400, and the emitter 500. That is, the multiplexer 200, the optical splitter 300, the optical modulator 400, and the emitter 500 may be provided on a single chip, or the light source unit 100, the multiplexer 200, the optical splitter 300, the optical modulator 400, and the emitter 500 may be provided on a single chip.

Hereinafter, the configurations of light source units and input units (input couplers) applicable to beam steering devices will be described with reference to FIGS. 5 to 8.

Figure 5:
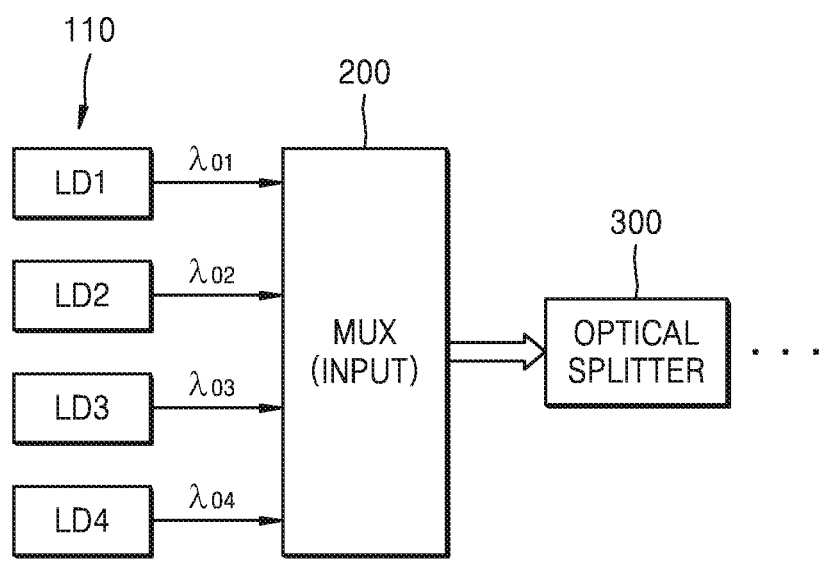
FIG. 5 is a block diagram illustrating a light source unit and an input unit applicable to a beam steering device according to an example embodiment.

FIG. 5 is a block diagram illustrating a light source unit and an input unit applicable to a beam steering device according to an example embodiment.

Referring to FIG. 5, in the example embodiment, a light source unit 110 may include a plurality of laser sources LD1 to LD4. Although four laser sources LD1 to LD4 are illustrated, the number of the laser sources may vary. The laser sources LD1 to LD4 may be laser diodes. The laser sources LD1 to LD4 may generate a plurality of lasers (laser beams) having different wavelengths (for example, wavelengths $\lambda_{o1}$, $\lambda_{o2}$, $\lambda_{o3}$, and $\lambda_{o4}$). The plurality of lasers having different wavelengths $\lambda_{o1}$, $\lambda_{o2}$, $\lambda_{o3}$, and $\lambda_{o4}$ that are generated by the laser sources LD1 to LD4 may be input to a multiplexer 200 and may be multiplexed. In this case, the multiplexer 200 may be considered as an input coupler (input unit). The light multiplexed by the multiplexer 200 may be split by an optical splitter 300. A configuration after the optical splitter 300 may be substantially the same as or similar to that described with reference to FIG. 4. According to another example embodiment, a multimode laser source may be used instead of the plurality of laser sources LD1 to LD4. In this case, the multimode laser source may generate a plurality of lasers (laser beams) having different wavelengths.

Figure 6:
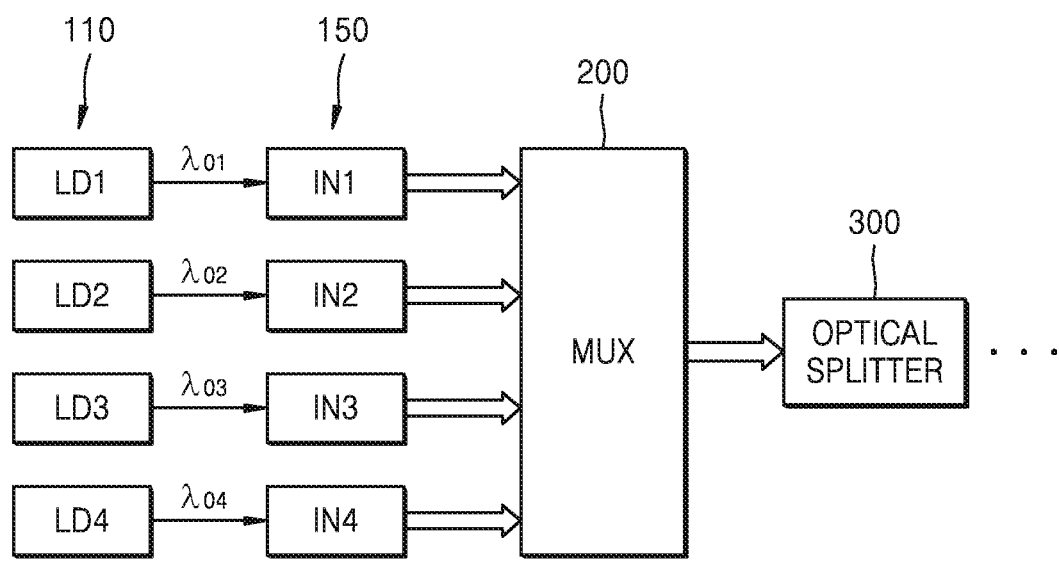
FIG. 6 is a block diagram illustrating a light source unit and an input unit applicable to a beam steering device according to another example embodiment.

FIG. 6 is a block diagram illustrating a light source unit and an input unit applicable to a beam steering device according to another example embodiment.

Referring to FIG. 6, lasers having different wavelengths $\lambda_{o1}$, $\lambda_{o2}$, $\lambda_{o3}$, and $\lambda_{o4}$ that are generated by laser sources LD1 to LD4 may be input to different input couplers IN1 to IN4, respectively. The input couplers IN1 to IN4 may constitute an "input unit 150." For example, the input couplers IN1 to IN4 may have an optical fiber structure or another structure. After passing through the input couplers IN1 to IN4, the plurality of lights may be multiplexed by a multiplexer 200 and may then be split by an optical splitter 300. A configuration after the optical splitter 300 may be substantially the same as or similar to that described with reference to FIG. 4.

The input couplers IN1 to IN4 and the multiplexer 200 illustrated in FIG. 6 may be connected to each other by an optical waveguide. In some cases, the combination of the input couplers IN1 to IN4 and the multiplexer 200 may be considered as an "input unit."

Figure 7:
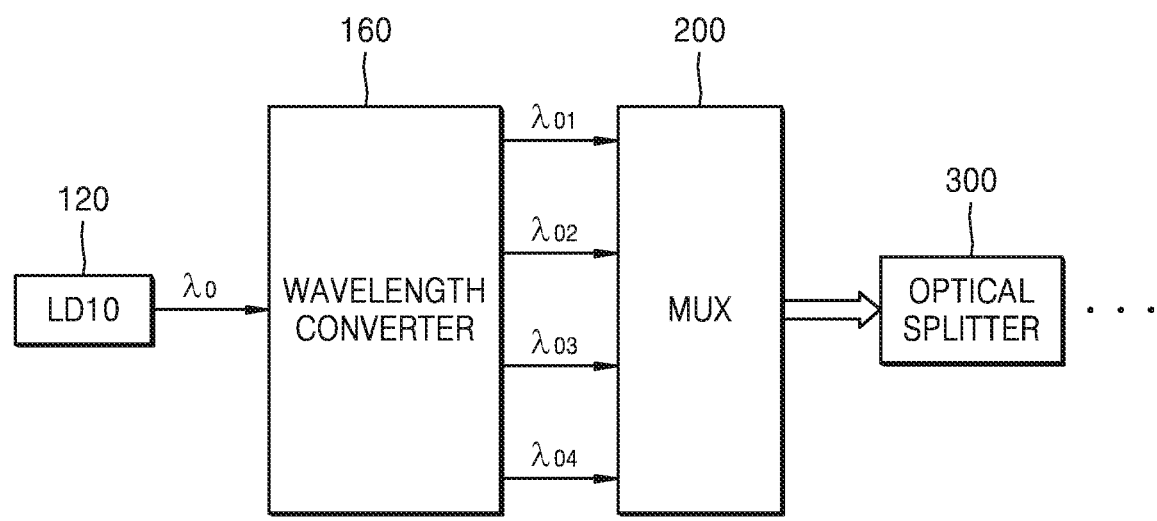
FIG. 7 is a block diagram illustrating a light source unit and an input unit applicable to a beam steering device according to another example embodiment.

FIG. 7 is a block diagram illustrating a light source unit and an input unit applicable to a beam steering device according to another example embodiment.

Referring to FIG. 7, a light source unit 120 may include a laser source LD10 configured to generate a laser having a single wavelength $\lambda_0$. That is, the light source unit 120 may be constituted by a single laser source LD10. A wavelength converter 160 may divide the laser generated by the laser source LD10 into a plurality of lasers having different wavelengths (for example, wavelengths $\lambda_{o1}$, $\lambda_{o2}$, $\lambda_{o3}$, and $\lambda_{o4}$). For example, the wavelength converter 160 may include an input coupler, an optical divider, and a plurality of wavelength converting elements. A laser input to the input coupler may be divided by the optical divider, and the wavelength of the divided laser may be converted by the wavelength converting elements. As a result, a plurality of lights having different wavelengths (for example, wavelengths $\lambda_{o1}$, $\lambda_{o2}$, $\lambda_{o3}$, and $\lambda_{o4}$) may be output from the wavelength converter 160. Then, the lights may be multiplexed by a multiplexer 200 and may then be split by an optical splitter 300. A configuration after the optical splitter 300 may be equal or similar to that described with reference to FIG. 4. The above-described configuration of the wavelength converter 160 is an example. That is, the configuration of the wavelength converter 160 may be variously modified.

The combination of the laser source LD10 and the wavelength converter 160 illustrated in FIG. 7 may be considered as a "light source unit." That is, it may be considered that such a light source unit generates a plurality of lights having different wavelengths (for example, wavelengths $\lambda_{o1}$, $\lambda_{o2}$, $\lambda_{o3}$, and $\lambda_{o4}$). In addition, at least a portion of the wavelength converter 160 or at least a portion of the multiplexer 200 may be considered as an "input coupler." Alternatively, the combination of the wavelength converter 160 and the multiplexer 200 may be considered as an input coupler.

Figure 8:
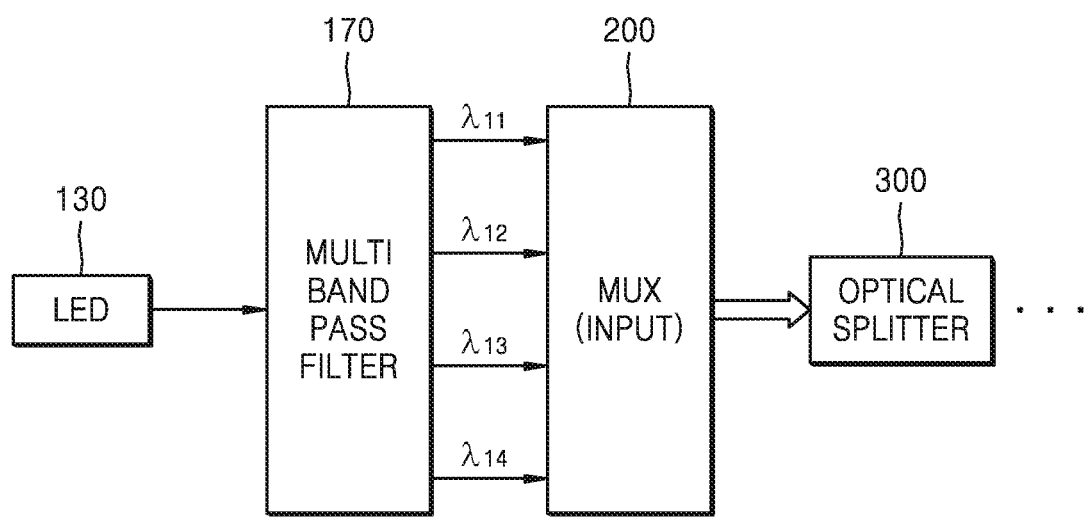
FIG. 8 is a block diagram illustrating a light source unit and an input unit applicable to a beam steering device according to another example embodiment.

FIG. 8 is a block diagram illustrating a light source unit and an input unit applicable to a beam steering device according to another example embodiment.

Referring to FIG. 8, a light source unit 130 may include a light emitting diode (LED). For example, the LED may be a white LED. In other words, the LED may be a device capable of emitting a wideband light. A multi-band pass filter 170 may divide the light generated by the light source unit 130. A plurality of lights having a plurality of wavelengths (for example, wavelengths $\lambda_{11}$, $\lambda_{12}$, $\lambda_{13}$, and $\lambda_{14}$) may be output through the multi-band pass filter 170. Then, the plurality of lights may be multiplexed by a multiplexer 200 and may then be split by an optical splitter 300. A configuration after the optical splitter 300 may be equal or similar to that described with reference to FIG. 4.

The combination of the LED (that is, the light source unit 130) and the multi-band pass filter 170 illustrated in FIG. 8 may be considered as a "light source unit." It may be considered that such a light source unit generates a plurality of lights having different wavelengths. In the example embodiment, the multiplexer 200 may be considered as an "input coupler."

Figure 9:
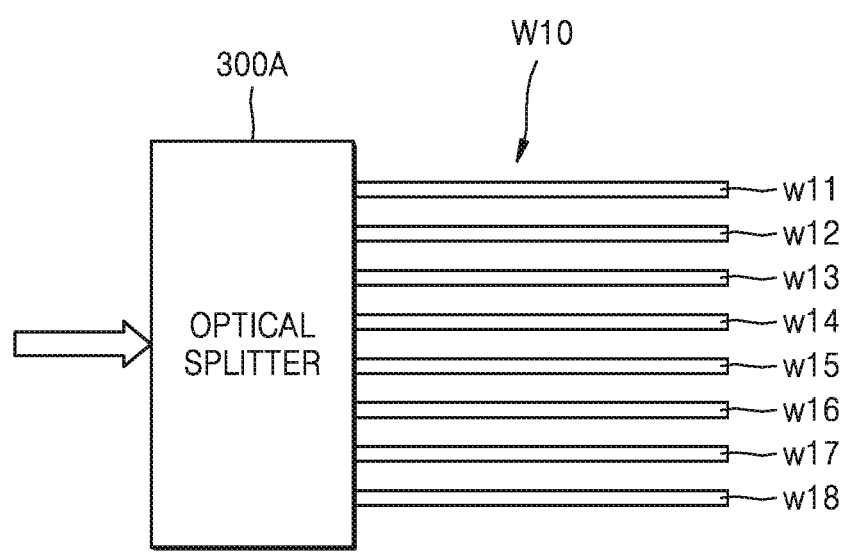
FIG. 9 is a plan view illustrating light split by an optical splitter applicable to a beam steering device according to an example embodiment.

FIG. 9 is a plan view illustrating light split by an optical splitter 300A applicable to a beam steering device according to an example embodiment.

Referring to FIG. 9, a light multiplexed by a multiplexer (such as the multiplexer 200 illustrated in FIG. 4) may be input to the optical splitter 300A and may be split by the optical splitter 300A. The split lights may be output (may propagate) through a plurality of optical path elements W10. The optical path elements W10 may be waveguides. For example, the optical path elements W10 may include first to eighth optical path elements w11 to w18. The first to eighth optical path elements w11 to w18 are examples. That is, the number of the optical path elements W10 may vary. Light output (propagating) through each of the first to eighth optical path elements w11 to w18 may have multiple wavelengths. The light output (propagating) through each of the first to eighth optical path elements w11 to w18 may include lights having wavelengths $\lambda_{o1}$, $\lambda_{o2}$, $\lambda_{o3}$, and $\lambda_{o4}$ illustrated in FIG. 5, for example. The optical splitter 300A may have a multimode interference (MMI) structure or another structure. In addition, the optical splitter 300A may use a multi-step beam splitting structure to increase the number of split beams. The structure of the optical splitter 300A may be variously modified.

Figure 10:
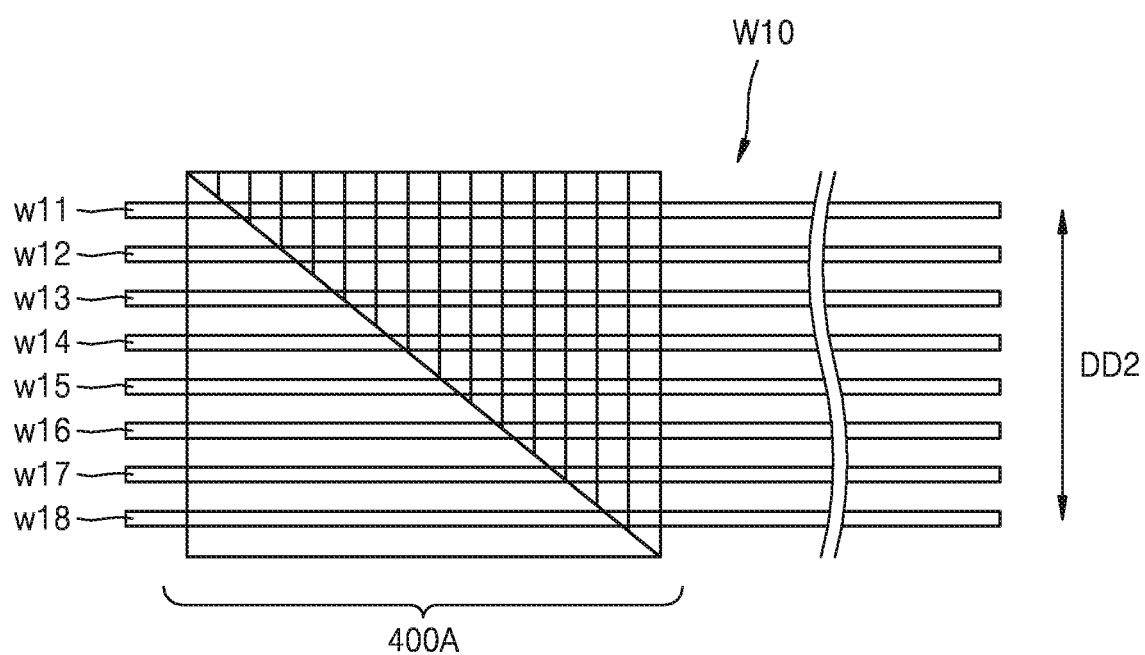
FIG. 10 is a plan view illustrating light modulation by an optical modulator applicable to a beam steering device according to an example embodiment.

FIG. 10 is a plan view illustrating light modulation by an optical modulator 400A applicable to a beam steering device according to an example embodiment.

Referring to FIG. 10, the optical modulator 400A may be placed on a plurality of optical path elements W10. The optical modulator 400A may be placed above or below the optical path elements W10. It may be considered that the optical path elements W10 are included in the optical modulator 400A. The optical path elements W10 may be those extending from the optical path elements W10 described with reference to FIG. 9. For example, the optical path elements W10 may include first to eighth optical path elements w11 to w18. However, the number of the optical path elements W10 is not limited thereto. The optical modulator 400A may modulate lights propagating through the optical path elements W10. The optical modulator 400A may modulate lights propagating through the first to eighth optical path elements w11 to w18. For example, a light propagating through the first optical path element w11 may be modulated to a first degree, a light propagating through the second optical path element w12 may be modulated to a second degree, a light propagating through the third optical path element w13 may be modulated to a third degree, a light propagating through the fourth optical path element w14 may be modulated to a fourth degree, a light propagating through the fifth optical path element w15 may be modulated to a fifth degree, a light propagating through the sixth optical path element w16 may be modulated to a sixth degree, a light propagating through the seventh optical path element w17 may be modulated to a seventh degree, and a light propagating through the eighth optical path element w18 may be modulated to an eighth degree. In other words, lights propagating through the first to eighth optical path elements w11 to w18 may be modulated to different degrees. As a result, the wavefronts of lights output from the first to eighth optical path elements w11 to w18 may be adjusted to control the directions of the output lights (beams). For example, the emission direction of the output light may be varied in a direction such as a second direction DD2 owing to optical modulation performed by the optical modulator 400A.

The structure and operational mechanism of the optical modulator 400A may be variously modified. For example, the optical modulator 400A may be configured to perform phase modulation, amplitude modulation, or phase-amplitude modulation. In addition, the optical modulator 400A may perform optical modulation by using a method such as an electric method, a magnetic method, a thermal method, or a mechanical method. In addition, for example, the structure, size, and number of the optical path elements W10 illustrated in FIG. 10 may be variously modified.

Figure 11:
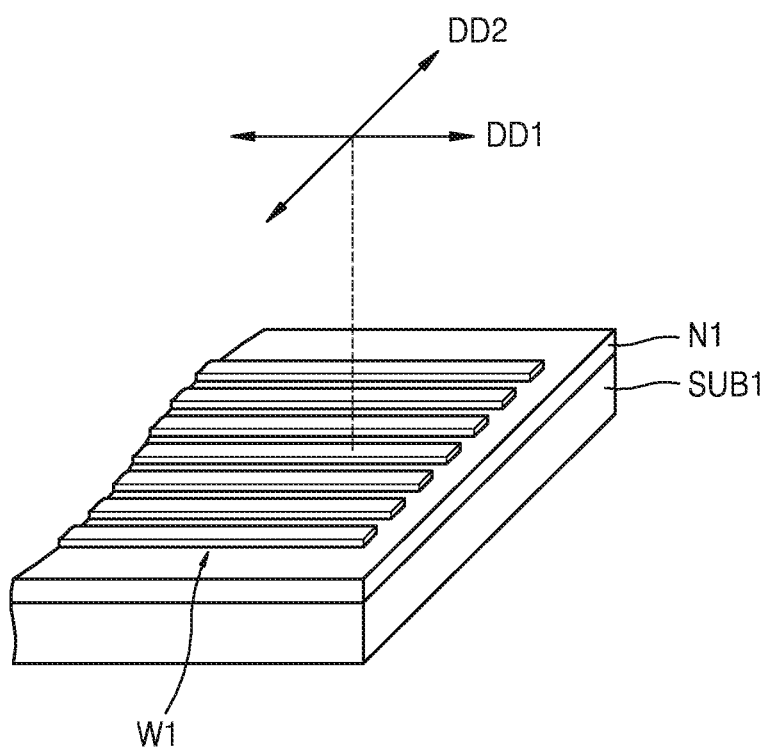
FIG. 11 is a perspective view illustrating a relationship between a steering direction and waveguides applicable to a beam steering device according to an example embodiment.

FIG. 11 is a perspective view illustrating a relationship between a steering direction and waveguides applicable to a beam steering device according to an example embodiment.

Referring to FIG. 11, the beam steering device may include a plurality of waveguides W1 formed on a substrate SUB1. An insulative layer N1 may be provided on the substrate SUB1, and the waveguides W1 may be arranged on the insulative layer N1. The insulative layer N1 is optional. That is, the insulative layer N1 may not be included in example embodiments. The waveguides W1 may extend in a direction. The waveguides W1 may be arranged in parallel with each other.

The plurality of waveguides W1 may be included in the output coupler OUT10 or the emitter 500 illustrated with reference to FIG. 1 or 4. In other words, the output coupler OUT10 and the emitter 500 may include the plurality of waveguides W1. Each of the waveguides W1 may have a grating structure. The characteristics or directions of lights (beams) output from the waveguides W1 may vary according to the shapes, sizes, or pattern intervals of the grating structures of the waveguides W1. Thus, the waveguides W1 may be considered as a grating coupler. In example embodiments, the optical modulator 400 illustrated in FIG. 4 may include the plurality of waveguides W1. In this case, the optical modulator 400 may modulate lights propagating through the plurality of waveguides W1.

For example, the first direction DD1 described with reference to FIGS. 1 and 2 may be parallel to an extension direction of the waveguides W1 illustrated in FIG. 11, and the second direction DD2 may be perpendicular to the extension direction of the waveguides W1 illustrated in FIG. 11. In other words, a plurality of output lights (refer to the output lights L20 illustrated in FIG. 1) may spread in a direction parallel to the extension direction of the waveguides W1, and as a result of the optical modulation, the emission directions of the output lights (refer to the output lights L20 illustrated in FIG. 1) may be varied in a direction perpendicular to the extension direction of the waveguides W1.

The structure and extension direction of the waveguides W1 illustrated in FIG. 11 are examples. That is, the structure and extension direction of the waveguides W1 may be variously modified. In addition, the relationship between the extension direction of the waveguides W1 and a steering direction is not limited to the description presented above.

Figure 12:
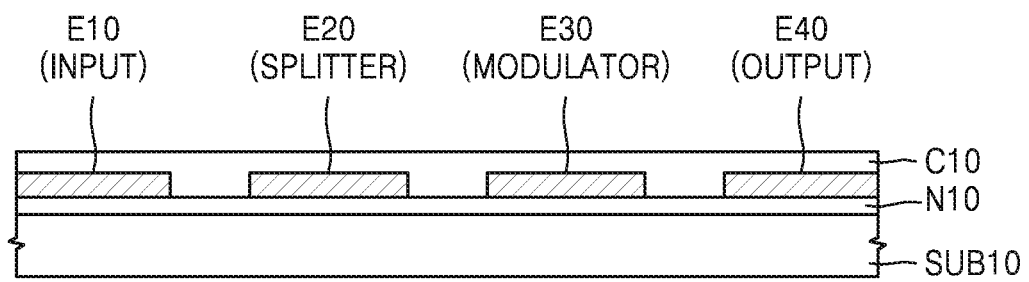
FIG. 12 is a cross-sectional view schematically illustrating a beam steering device provided in the form of a single device (semiconductor device), according to an example embodiment.

FIG. 12 is a cross-sectional view schematically illustrating a beam steering device provided in the form of a single device (semiconductor device), according to an example embodiment.

Referring to FIG. 12, the beam steering device may include an input coupler E10 and an output coupler E40 that are arranged on a substrate SUB10. In addition, the beam steering device may further include an optical splitter E20 and an optical modulator E30 that are arranged between the input coupler E10 and the output coupler E40. An insulative layer N10 may be optionally provided on the substrate SUB10, and the input coupler E10, the optical splitter E20, the optical modulator E30, and the output coupler E40 may be arranged on the insulative layer N10. Optical waveguide(s) may be provided between two neighboring elements, that is, between the input coupler E10 and the optical splitter E20, between the optical splitter E20 and the optical modulator E30, and between the optical modulator E30 and the output coupler E40.

The input coupler E10 may be configured to receive a plurality of lights having different wavelengths. To this end, the input coupler E10 may include a multiplexer. For example, the optical splitter E20 may have a multimode interference (MMI) structure or another structure. The optical modulator E30 may perform an optical modulation operation by using an electric method or another method such as a magnetic method, a thermal method, or a mechanical method. In addition, the optical modulator E30 may use various modulation methods such as a phase modulation method or an amplitude modulation method. The optical modulator E30 may include a plurality of waveguides and may modulate beams propagating through the waveguides. For example, the output coupler E40 may include a plurality of waveguides and grating structures respectively formed on the waveguides. The structures of the input coupler E10, the optical splitter E20, the optical modulator E30, and the output coupler E40 are not limited to those described above and may be variously modified.

A cover layer C10 may be further provided on the substrate SUB10 to cover the input coupler E10, the optical splitter E20, the optical modulator E30, and the output coupler E40. The cover layer C10 may include a low refractive material having a relatively low refractive index. For example, the cover layer C10 may include a dielectric material such as a silicon oxide or a polymer-based material. The cover layer C10 may also function as a protective layer. However, the cover layer C10 may not be provided in example embodiments.

Any one or any combination of the input coupler E10, the optical splitter E20, the optical modulator E30, and the output coupler E40 may include: any one or any combination of a group IV element such as silicon (Si) or germanium (Ge); a compound containing a group IV element such as SiGe; a group III-V compound; an oxide; a nitride; and a polymer. In example embodiments, at least two of the input coupler E10, the optical splitter E20, the optical modulator E30, and the output coupler E40 may include different materials. If the substrate SUB10 includes silicon (Si), or any one or any combination of the input coupler E10, the optical splitter E20, the optical modulator E30, and the output coupler E40 includes silicon (Si), the beam steering device of the example embodiment may be implemented/manufactured using a silicon photonics technique. Because the silicon photonics technique is used in (that is, compatible with) a complementary metal oxide semiconductor (CMOS) process, the silicon photonics technique may make it easy to perform manufacturing processes.

Figure 13:
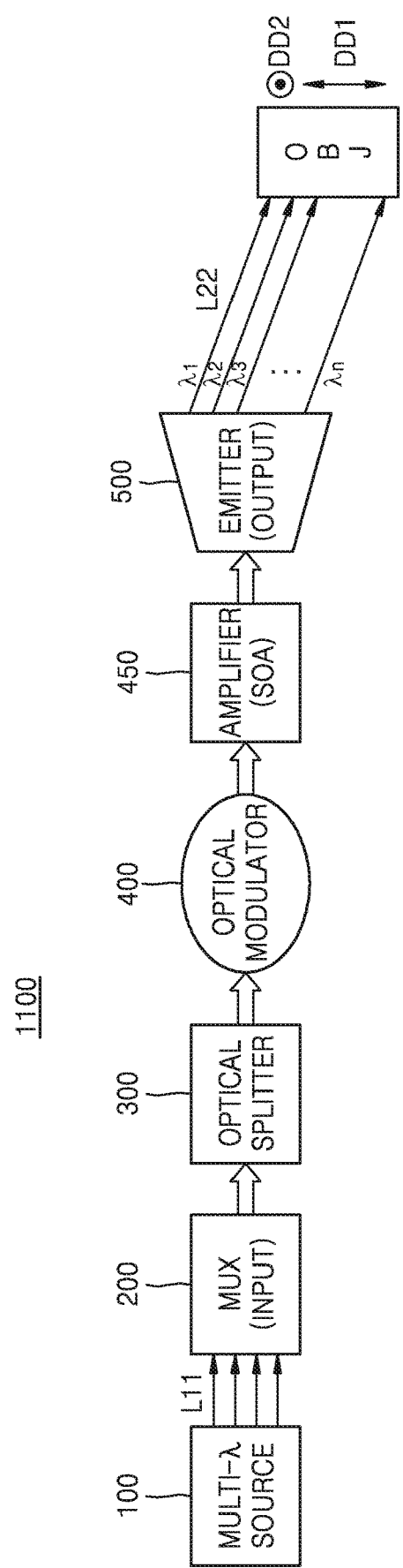
FIG. 13 is a block diagram illustrating an example configuration of a beam steering device according to another example embodiment.

FIG. 13 is a block diagram illustrating an example configuration of a beam steering device 1100 according to another example embodiment. The beam steering device 1100 of the current example embodiment is a modification of the beam steering device 1000 illustrated in FIG. 4.

Referring to FIG. 13, the beam steering device 1100 may further include an amplifier 450 between a multiplexer 200 and an emitter 500. For example, the amplifier 450 may be placed between an optical modulator 400 and the emitter 500. The amplifier 450 may have a semiconductor optical amplifier (SOA) structure, for example. The amplifier 450 may amplify optical signals so that the intensity of lights generated by a light source unit 100 may be maintained at the emitter 500. Alternatively, the amplifier 450 may increase a signal-to-noise ratio (SNR). The position and configuration of the amplifier 450 described with reference to FIG. 13 are examples. That is, the position and configuration of the amplifier 450 may vary.

Figure 14:
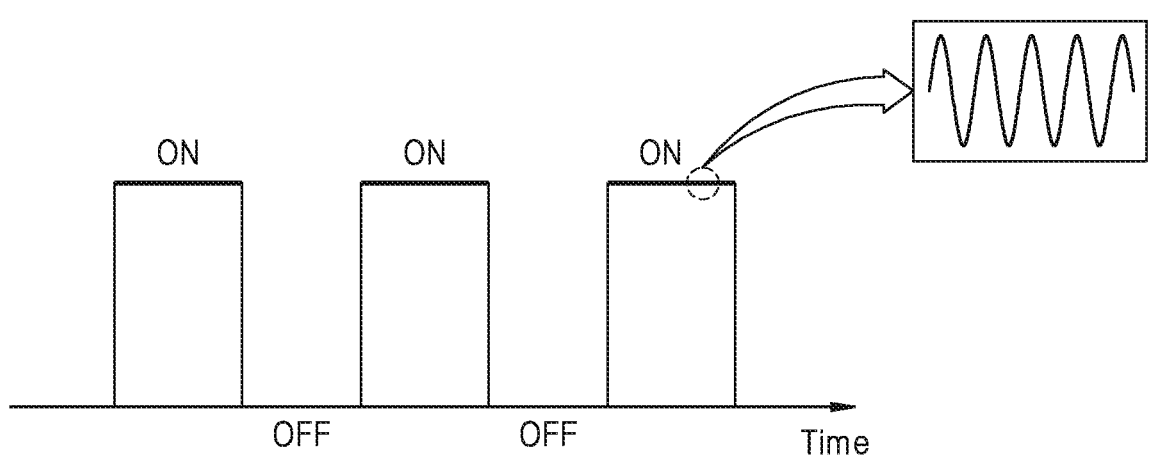
FIG. 14 is a graph illustrating a light type as an example of light applicable to a beam steering device according to an example embodiment.

FIG. 14 is a graph illustrating a light type as an example of light applicable to a beam steering device according to an example embodiment.

Referring to FIG. 14, the light generated by a light source unit of the beam steering device may have a pulse waveform. For example, if the light source unit generates a laser, the laser may be a pulsed laser. Thus, ON and OFF states of the light may be alternately repeated, and in the ON state, light having a wavelength (or wavelength band) may be generated as shown in an enlarged section on the right side of FIG. 14. For example, the wavelength of the light may correspond to one of wavelengths $\lambda_{01}$, $\lambda_{02}$, $\lambda_{03}$, and $\lambda_{04}$ shown in FIG. 5. A pulse wave (for example, a pulsed laser) is different from a continuous wave (CW) or a CW laser. The CW laser may be used for the Doppler effect, and the pulse wave (for example, pulsed laser) may be used for other purposes and effects. However, the type of light used according to example embodiments is not limited to the type described with reference to FIG. 14. That is, the type of light may vary according to example embodiments.

The above-described beam steering devices of the example embodiments may be applied to various optical apparatuses. For example, the beam steering devices may be applied to light detection and ranging (LiDAR) apparatuses.

Figure 15:
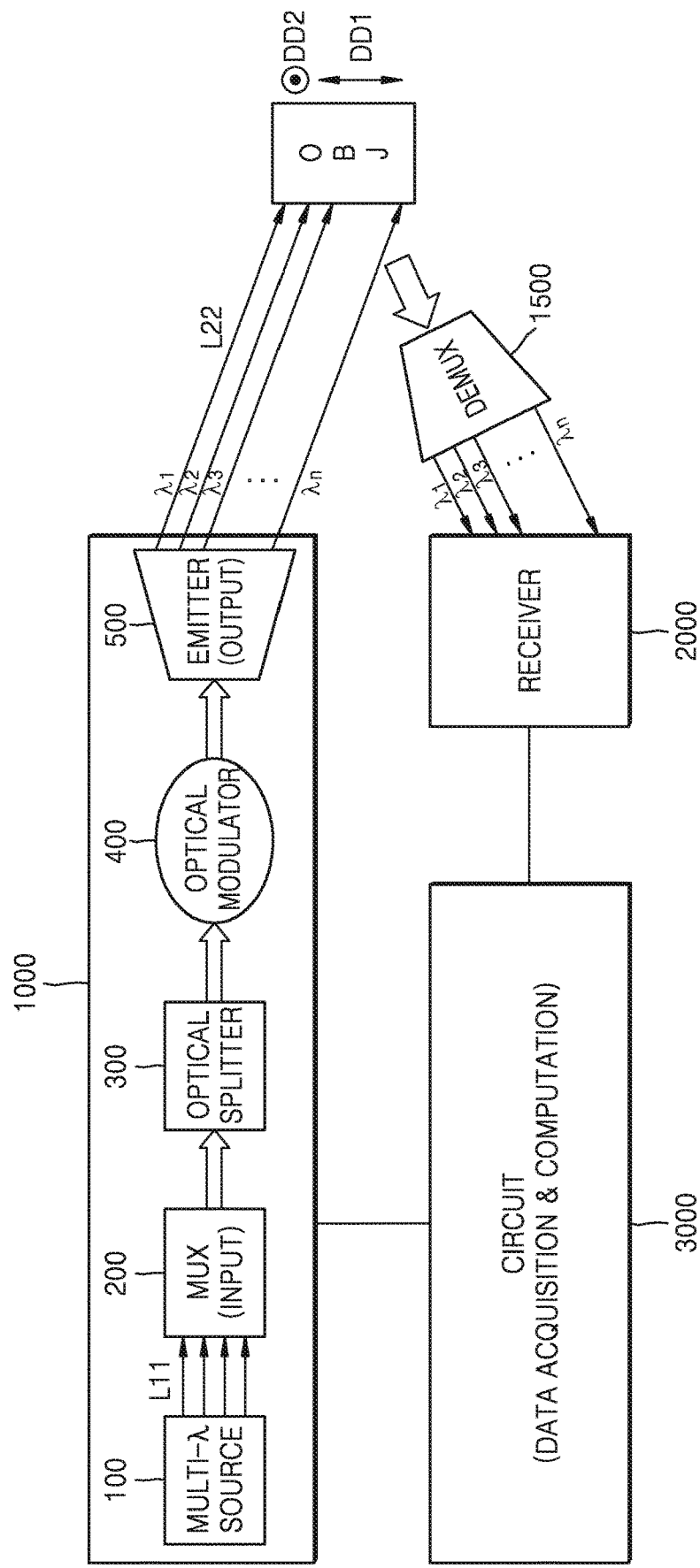
FIG. 15 is a diagram illustrating an optical apparatus including a beam steering device according to an example embodiment.

FIG. 15 is a diagram illustrating an optical apparatus including a beam steering device 1000 according to an example embodiment. The optical apparatus of the example embodiment may be a LiDAR apparatus.

Referring to FIG. 15, the beam steering device 1000 of the optical apparatus may correspond to one of the beam steering devices D100, 1000, and 1100 of the previous example embodiments, or may be obtained by modifying the beam steering devices D100, 1000, and 1100. In the current example embodiment, the beam steering device 1000 may have the configuration illustrated in FIG. 4. That is, the beam steering device 1000 may include a light source unit 100, a multiplexer 200, an optical splitter 300, an optical modulator 400, and an emitter 500. The beam steering device 1000 may simultaneously emit a plurality of output lights L22 having different wavelengths toward an object OBJ. The output lights L22 may be emitted to different points arranged in a first direction DD1, simultaneously. The emission directions of the output lights L22 may be varied in a second direction DD2 different from the first direction DD1. The second direction DD2 may be perpendicular to the first direction DD1. The second direction DD2 may be referred to as a scanning direction.

The optical apparatus may include a light receiver 2000 to receive the output lights L22 emitted from the beam steering device 1000 and reflected from the object OBJ, that is, to receive reflected light. Reflection may include general reflection and scattering. In addition, "reflection" may include variations (modulations) of light caused by the object OBJ. The light receiver 2000 may include a plurality of photo detecting elements, and the photo detecting elements may have an arrayed structure. For example, the photo detecting elements may include photodiodes, phototransistors, and/or charge-coupled devices (CCDs).

The optical apparatus may further include a demultiplexer (DEMUX) 1500 between the object OBJ and the light receiver 2000. The demultiplexer 1500 may demultiplex light reflected from the object OBJ to divide the light into a plurality of lights having different wavelengths (for example, $\lambda_1$, $\lambda_2$, $\lambda_3$, ..., and $\lambda_n$. The wavelengths (for example, $\lambda_1$, $\lambda_2$, $\lambda_3$, ..., and $\lambda_n$) may respectively correspond to or may be respectively similar to the wavelengths (for example, $\lambda_1$, $\lambda_2$, $\lambda_3$, ..., and $\lambda_n$) of the output lights L22 emitted from the beam steering device 1000.

In addition, the optical apparatus may further include a circuit unit 3000 connected to either one or both of the beam steering device 1000 and the light receiver 2000. The circuit unit 3000 may include a calculating portion configured to acquire data and perform computation using the data. The circuit unit 3000 may further include a driver or a controller. In addition, the circuit unit 3000 may further include a power source unit and a memory. The configuration of the circuit unit 3000 may be variously modified according to the type of the optical apparatus. The circuit unit 3000 may be connected to a user interface UI.

The optical apparatus of the example embodiment may use the light receiver 2000 to acquire information about a plurality of wavelengths from light reflected from the object OBJ and analyze information about the object OBJ, based on the acquired information. If the light receiver 2000 includes a plurality of photo detecting elements, the photo detecting elements may be used to obtain information about a plurality of wavelengths and analyze information about the object OBJ, based on the acquired information. Three-dimensional information about the object OBJ may be rapidly and precisely obtained by rapidly scanning the object OBJ in a two-dimensional manner, using a plurality of output lights L22 having different wavelengths.

In example embodiments, the optical apparatus illustrated in FIG. 15 may further include at least one optical element. For example, the optical apparatus may further include a filter to detect light reflection points, according to wavelengths, and/or another optical element to control the intensity of light, according to wavelengths between the object OBJ and the light receiver 2000. An example of this is illustrated in FIG. 16.

Figure 16:
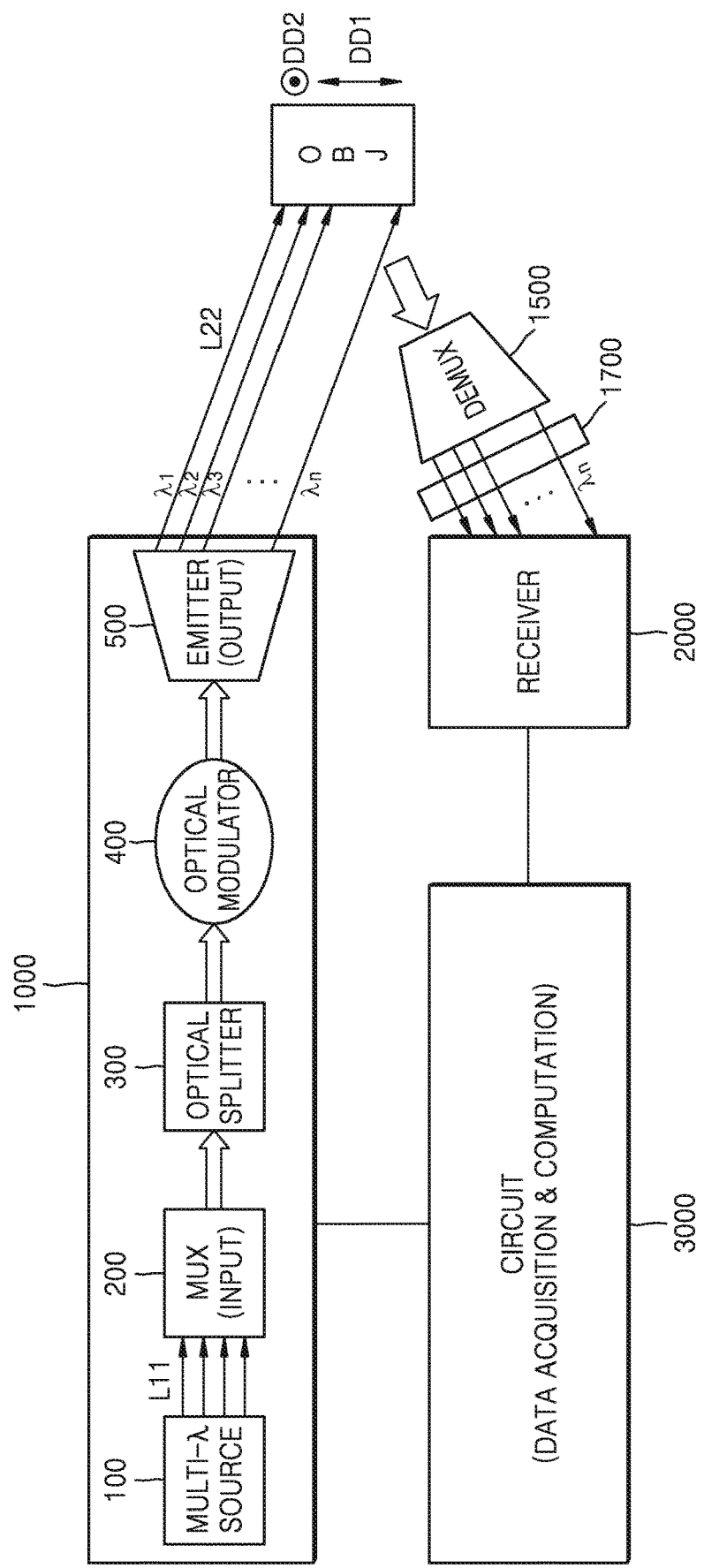
FIG. 16 is a diagram illustrating an optical apparatus including a beam steering device according to another example embodiment.

FIG. 16 is a diagram illustrating an optical apparatus including a beam steering device 1000 according to another example embodiment.

Referring to FIG. 16, a filter 1700 may be provided between the demultiplexer 1500 and the light receiver 2000. Light may be divided into multiple wavelengths by the demultiplexer 1500, and light of a wavelength may reach a pixel of the light receiver 2000 through the filter 1700. Thus, the filter 1700 may be used to determine the position at which light of a wavelength is reflected from the object OBJ. At least one other optical element may be used instead of or together with the filter 1700 between the demultiplexer 1500 and the light receiver 2000. For example, the at least one other optical element may include an optical element configured to control the intensity of reflected light according to the wavelengths of the reflected light. The intensity of reflected light may be controlled according to the wavelengths of the reflected light by using such an optical element. In addition, the optical apparatus of the example embodiment may further include a resonator or another optical element.

Figure 17:
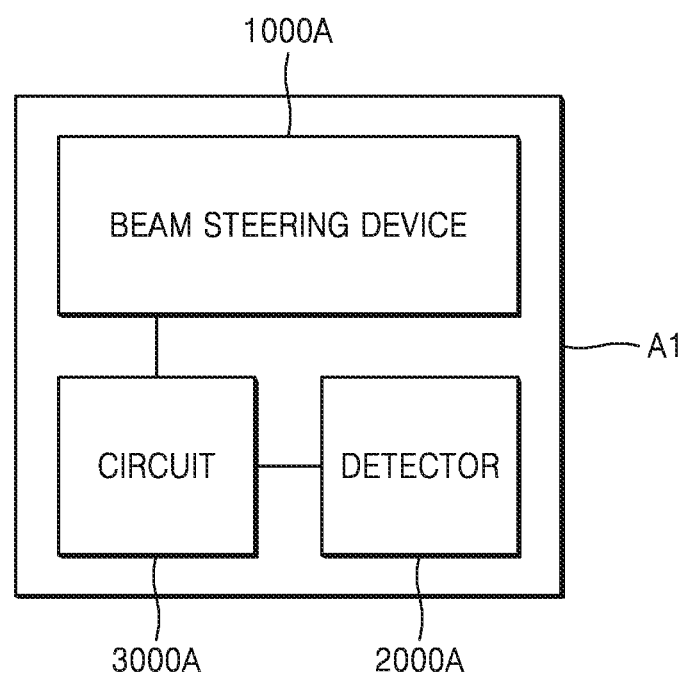
FIG. 17 is a block diagram illustrating an overall systematic structure of an optical apparatus including a beam steering device according to an example embodiment.

FIG. 17 is a block diagram illustrating an overall systematic structure of an optical apparatus A1 including a beam steering device 1000A according to an example embodiment.

Referring to FIG. 17, the optical apparatus A1 may include the beam steering device 1000A. The beam steering device 1000A may correspond to or may be similar to the beam steering devices described with reference to FIGS. 1, 2, and 4 to 16. The optical apparatus A1 may include a light source unit provided as a part of or independently of the beam steering device 1000A.

The optical apparatus A1 may include a detector 2000A to detect light steered by the beam steering device 1000A and reflected from an object. The detector 2000A may include the light receiver 2000 described with reference to FIG. 15. In addition, the detector 2000A may further include the demultiplexer 1500 described with reference to FIG. 15. In addition, the detector 2000A may further include the filter 1700 described with reference to FIG. 16 or another optical element.

In addition, the optical apparatus A1 may further include a circuit unit 3000A connected to either one or both of the beam steering device 1000A and the detector 2000A. The circuit unit 3000A may include a calculating portion configured to acquire data and perform computation using the data. The circuit unit 3000A may further include a driver or a controller. In addition, the circuit unit 3000A may further include a power source unit and a memory.

FIG. 17 illustrates that the optical apparatus A1 includes the beam steering device 1000A and the detector 2000A in a single device or apparatus. However, the beam steering device 1000A and the detector 2000A may be provided separately from each other in independent devices. In addition, the circuit 3000A may be connected to the beam steering device 1000A or the detector 2000A by a wireless communication method instead of a wired communication method. The configuration illustrated in FIG. 17 may be variously modified.

The optical apparatuses of the example embodiments may be LiDAR apparatuses. The LiDAR apparatuses may be time-of-flight (TOF) or phase-shift type apparatuses. The LiDAR apparatuses may be applied to autonomous vehicles, aircrafts such as drones, mobile devices, small vehicles (such as bicycles, motorcycles, babe carriages, or boards), robots, assistant devices or items for humans/animals (such as sticks, helmets, accessories, clothes, watches, or bags), Internet of Things (IoT) devices/systems, security devices/systems, etc. Because the beam steering devices and the optical apparatuses including the beam steering devices according to the example embodiments are usable to obtain three-dimensional information about spaces and objects via two-dimensional scanning, the beam steering devices and the optical apparatuses may be applied to three-dimensional image acquisition apparatuses or three-dimensional cameras. In addition, the beam steering devices and the optical apparatuses including the beam steering devices according to the example embodiments may be used for various purposes in a wide range of optical fields and electronic fields.

It may be understood that the example embodiments described herein may be considered in a descriptive sense only and not for purposes of limitation. For example, those of ordinary skill in the art will understand that the structures of the beam steering devices are not limited to those illustrated in FIGS. 4 and 13 but may be variously modified as long as the beam steering devices are capable of scanning multiple points of an object using multiple wavelengths as described with reference to FIGS. 1 and 2. In addition, it will be understood by those of ordinary skill in the art that the structures of the beam steering devices described with reference to FIGS. 4 to 13 and the structures of the optical apparatuses described with reference to FIGS. 15 to 17 can be variously modified. For example, at least one wavelength variable laser source (that is, tunable laser source) may be included in the beam steering devices, and the demultiplexer may be replaced with an equivalent or similar element. In addition, a one-dimensional scanning device (a device performing a one-dimensional scanning operation using multi-wavelengths) and an optical apparatus including the one-dimensional scanning device may be implemented according to the example embodiments. In addition, the beam steering devices and the optical apparatuses may be applied in various other fields by various other application methods. Thus, the scope and spirit of the inventive concept are defined not by the descriptions of the example embodiments but by the appended claims.

The foregoing example embodiments are examples and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. A beam steering device comprising:
   a light source configured to generate input lights having first different wavelengths;
   a multiplexer configured to simultaneously receive the generated input lights, and multiplex the received input lights into a multiplexed light;
   an optical splitter configured to split the multiplexed light;
   an optical modulator configured to modulate the split light; and
   an emitter configured to simultaneously emit output lights having second different wavelengths to different first points arranged in a first direction, based on the modulated light,
   wherein as the split light is further modulated, the output lights are moved from the different first points, in a second direction perpendicular to the first direction, and to different second points arranged in the first direction, so that the output lights are simultaneously emitted to the different second points.

2. The beam steering device of claim 1, wherein either one or both of the emitter and the optical modulator comprises waveguides,
   the first direction is parallel to an extension direction of the waveguides, and
   the second direction is perpendicular to the extension direction of the waveguides.

3. The beam steering device of claim 1, wherein either one or both of the emitter and the optical modulator comprises waveguides, and
   the first direction is parallel to an extension direction of the waveguides.

4. The beam steering device of claim 1, wherein the optical modulator comprises a phase modulator.

5. The beam steering device of claim 1, wherein the light source comprises laser sources or a multimode laser source, the laser sources or the multimode laser source being configured to generate the input lights having the first different wavelengths.

6. The beam steering device of claim 1, wherein the light source comprises:
   a laser source configured to generate a light having a wavelength; and
   a wavelength converter configured to divide the generated light into the input lights having the first different wavelengths.

7. The beam steering device of claim 1, wherein the light source comprises:
   a light emitting diode (LED) configured to generate light; and
   a multi-band pass filter configured to divide the generated light into the generated input lights.

8. The beam steering device of claim 1, wherein each of the generated input lights has a pulse waveform.

9. The beam steering device of claim 1, wherein any one or any combination of the optical splitter, the optical modulator, and the emitter comprises any one or any combination of a group IV element, a compound comprising a group IV element, a group III-V compound, an oxide, a nitride, and a polymer.

10. The beam steering device of claim 1, further comprising an amplifier disposed between the multiplexer and the emitter, and having a semiconductor optical amplifier (SOA) structure.

11. An optical apparatus comprising:
    the beam steering device of claim 1;
    a light receiver configured to receive light that is emitted from the beam steering device and reflected from an object; and
    a circuit connected to either one or both of the beam steering device and the light receiver.

12. The optical apparatus of claim 11, further comprising a demultiplexer disposed between the object and the light receiver, and configured to demultiplex the reflected light, and divide the demultiplexed light into reflected lights having third different wavelengths,
    wherein the light receiver is further configured to receive the reflected lights.

13. The optical apparatus of claim 12, wherein the light receiver comprises photo detecting elements, and
    the optical apparatus is configured to acquire information of the third different wavelengths of the reflected lights, using the photo detecting elements, and analyze information of the object, based on the acquired information.

14. The optical apparatus of claim 11, wherein the optical apparatus is a LiDAR apparatus.

15. The beam steering device of claim 1, wherein the split light is modulated by modulating an amplitude and a phase of the split light.

16. A beam steering device comprising:
    an input coupler configured to simultaneously receive input lights having first different wavelengths; and
    an output coupler configured to, based on the received input lights:
      simultaneously emit output lights having second different wavelengths to different first points arranged in a first direction; and
      move the output lights from the different first points, in a second direction perpendicular to the first direction, and to different second points different second points.

17. The beam steering device of claim 16, further comprising waveguides disposed between the input coupler and the output coupler,
    wherein the first direction is parallel to an extension direction of the waveguides, and
    the second direction is perpendicular to the extension direction of the waveguides.

18. The beam steering device of claim 16, further comprising an optical modulator disposed between the input coupler and the output coupler, and configured to move the emitted output lights in the second direction, based on the received input lights.

19. The beam steering device of claim 16, wherein the input coupler comprises a multiplexer configured to simultaneously receive the input lights, and multiplex the received input lights.

20. An optical apparatus comprising:
    the beam steering device of claim 16;
    a light receiver configured to receive light that is emitted from the beam steering device and reflected from an object; and
    a circuit connected to either one or both of the beam steering device and the light receiver.

21. The optical apparatus of claim 20, further comprising a demultiplexer disposed between the object and the light receiver, and configured to demultiplex the reflected light, and divide the demultiplexed light into reflected lights having third different wavelengths,
    wherein the light receiver is further configured to receive the reflected lights.

22. The optical apparatus of claim 20, wherein the optical apparatus is a LiDAR apparatus.

23. A beam steering device comprising:
a multiplexer configured to simultaneously receive input lights having first different wavelengths, and multiplex the received input lights into a multiplexed light;
an optical splitter configured to split the multiplexed light;
an optical modulator configured to modulate the split light; and
an emitter configured to, based on the modulated light:
simultaneously emit output lights having second different wavelengths to different first points arranged in a first direction and of an object; and
move the output lights from the different first points, in a second direction perpendicular to the first direction, and to different second points arranged in the first direction, so that the output lights are simultaneously emitted to the different second points.

24. The beam steering device of claim 23, further comprising:
laser sources configured to generate the input lights having the first different wavelengths; and
input couplers configured to simultaneously receive the generated input lights, and transmit the received input lights to the multiplexer.

25. The beam steering device of claim 23, wherein either one or both of the emitter and the optical modulator comprises:
a substrate;
an insulative layer disposed on the substrate; and
waveguides disposed on the insulative layer,
the first direction is parallel to an extension direction of the waveguides, and
the second direction is perpendicular to the extension direction of the waveguides.

26. The beam steering device of claim 23, further comprising a cover layer disposed on the multiplexer, the optical splitter, the optical modulator, and the emitter.

27. An optical apparatus comprising:
the beam steering device of claim 23;
a demultiplexer configured to receive light that is reflected from the object, demultiplex the reflected light, and divide the demultiplexed light into reflected lights having third different wavelengths; and
a light receiver configured to receive the reflected lights.

* * * * *